(12) United States Patent
Takayama et al.

(10) Patent No.: US 6,311,492 B1
(45) Date of Patent: Nov. 6, 2001

(54) MASTER CYLINDER

(75) Inventors: Toshio Takayama; Kunihiro Matsunaga, both of Yamanashi-ken (JP)

(73) Assignee: Tokico Ltd., Kanagawa-Ken (JP)

(*) Notice: Subject to any disclaimer, the term of this patent is extended or adjusted under 35 U.S.C. 154(b) by 0 days.

(21) Appl. No.: 09/504,865

(22) Filed: Feb. 16, 2000

(30) Foreign Application Priority Data

Feb. 18, 1999 (JP) .................................................. 11-040326

(51) Int. Cl.[7] .................................................... B60T 11/60
(52) U.S. Cl. ............................... 60/562; 60/568; 60/588
(58) Field of Search ........................... 60/561, 562, 568, 60/581, 585, 588

(56) References Cited

U.S. PATENT DOCUMENTS

| | | | |
|---|---|---|---|
| 2,169,524 | * 8/1939 | Fowler | 60/562 |
| 4,736,646 | * 4/1988 | Bertling et al. | 60/562 |
| 4,914,917 | * 4/1990 | Schonlau | 60/545 |
| 4,949,542 | * 8/1990 | Pruett | 60/594 |
| 5,027,599 | * 7/1991 | Nishii et al. | 60/547.1 |
| 5,414,998 | * 5/1995 | Manzo et al. | 60/562 |
| 5,720,170 | * 2/1998 | Hageman et al. | 60/562 |
| 5,729,979 | 3/1998 | Shaw et al. | |

FOREIGN PATENT DOCUMENTS 2084275   4/1982  (GB) .

* cited by examiner

*Primary Examiner*—John E. Ryznic
(74) *Attorney, Agent, or Firm*—Wenderoth, Lind & Ponack, L.L.P.

(57) ABSTRACT

A master cylinder realizes a stroke simulator function without the need to change the structure around a brake pedal and without impairing brake pedal feel, is easy to form by machining, and also facilitates a hydraulic fluid charging and air bleeding operation. A secondary piston is split to make the axial length thereof variable, thereby imparting the stroke simulator function to the secondary piston. By doing so, brake pedal feel is improved more than by separately adding a stroke simulator.

11 Claims, 2 Drawing Sheets

MASTER CYLINDER

BACKGROUND OF THE INVENTION

The present invention relates to a master cylinder and, more particularly, to a master cylinder suitable for use in a brake-by-wire type brake system (hereinafter referred to as "BBW system") in which a brake pedal operating quantity (stroke, pedal force, etc.) is detected, and braking force corresponding to the detected brake pedal operating quantity is generated by supplying a high-pressure brake fluid from an external fluid pressure source to a wheel cylinder under control.

In general, this type of BBW system is equipped with a failsafe master cylinder that is connected to the brake pedal to supply a high-pressure brake fluid to the wheel cylinder instead of the external fluid pressure source in case of a system failure. The BBW system is also equipped with a stroke simulator, which operates as follows. When the system capable of supplying the brake fluid to the wheel cylinder from the external fluid pressure source under control is in a normal operative state, the stroke simulator provides pedal response, i.e. appropriate resistance to the depression of the brake pedal, to make the driver feel the brake system responding to the braking operation. There are two types of stroke simulators used in such BBW systems: a fluid pressure absorbing type in which an accumulator for containing the pressurized hydraulic fluid from the master cylinder is connected to the output side of the master cylinder to absorb the fluid pressure delivered from the master cylinder; and a pedal stroke type in which the brake pedal and the master cylinder are mechanically connected through a resilient member so that when the system is in a normal state, only the pedal stroke of the brake pedal is effected.

The fluid pressure absorbing type suffers, however, from the problem that when the master cylinder starts a stroke, the starting resistance of the piston seal in the accumulator is added to the resistance to the depression of the brake pedal. Therefore, the stroke simulator requires the driver to exert a pedal input corresponding to the sum total of the starting fluid pressure of the master cylinder itself and the starting fluid pressure of the accumulator. Consequently, the brake pedal feel becomes heavy.

The pedal stroke type unfavorably needs to change the structure around the brake pedal because of the need for providing a resilient member between the brake pedal and the master cylinder.

To solve the above problems, U.S. Pat. Nos. 5,720,170 and 5,729,979 disclose inventions in which the primary piston in the master cylinder is split to make the axial length of the primary supply chamber variable, thereby imparting the function of a stroke simulator to the primary piston. However, the structures of the two inventions have the problem that the cylinder bore is a stepped bore (with three stepped portions) and hence difficult to form by machining. In addition, the supply chamber portion of the primary piston, which exhibits the simulator function, is not in the course of flow of the hydraulic fluid from the reservoir to the discharge opening of the master cylinder, but present in the form of a blind alley with respect to the flow. Accordingly, it is difficult to carry out the hydraulic fluid charging and bleeding operation smoothly.

SUMMARY OF THE INVENTION

In view of the above-described problems, an object of the present invention is to provide a master cylinder capable of realizing the stroke simulator function without the need to change the structure around the brake pedal and without impairing the brake pedal feel and easy to form by machining and also facilitating the hydraulic fluid charging and air bleeding operation.

The present invention is applied to a master cylinder having a cylinder with a cylinder bore one end of which is closed to form a bottom. At least one piston is slidably disposed in the cylinder bore for partially defining a fluid pressure generating chamber which is connected to at least one wheel cylinder. In the invention, the piston includes a front piece adjacent to the fluid pressure generating chamber and a rear piece on the side of the front piece remote from the fluid pressure generating chamber. Seals are supported by the front and rear pieces to define therebetween a fluid supply chamber for the fluid pressure generating chamber. The seal supported by the front piece separates the fluid pressure generating chamber from the fluid supply chamber. There is a device for connecting the front and rear pieces so that it permits the distance between these pieces to be reduced upon application of an input force to the piston while exerting a reaction force and restores the original distance upon cancellation of the input force.

The present invention is also applicable to a tandem master cylinder having primary and secondary pistons independently slidably disposed in a cylinder bore in series in the axial direction of the cylinder bore for respectively partially defining independent primary and secondary fluid pressure generating chambers which are connected to wheel cylinders. The secondary piston is placed closer to the bottom of the cylinder bore than the primary piston. In the invention, the secondary piston includes a front piece adjacent to the secondary fluid pressure generating chamber and a rear piece on the side of the front piece remote from the secondary fluid pressure generating chamber. A seal is supported by the front piece to separate the secondary fluid pressure generating chamber and a fluid supply chamber for the secondary fluid pressure generating chamber. There is a device for connecting the font and rear pieces so that it permits the distance between these pieces to be reduced upon application of an input force to the secondary piston while exerting a reaction force and restores the original distance upon cancellation of the input force.

The above and other objects, features and advantages of the present invention will become more apparent from the following description of the preferred embodiments thereof, taken in conjunction with the accompanying drawings.

DETAILED DESCRIPTION OF THE INVENTION

A master cylinder according to an embodiment of the present invention will be described below in detail with reference to the accompanying drawings.

Figure 1:
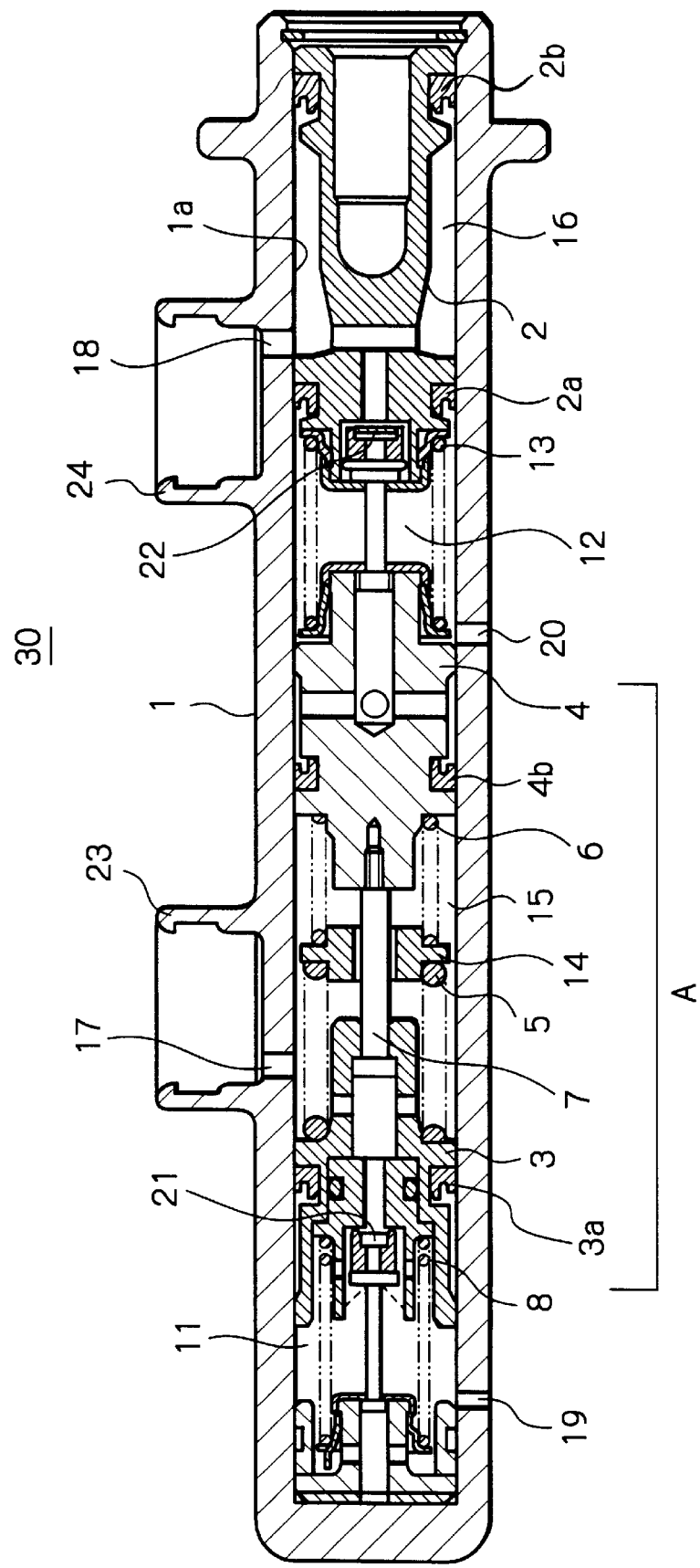
FIG. 1 is an axial vertical sectional view of a master cylinder according to an embodiment of the present invention.

FIG. 1 is a vertical sectional view of a master cylinder 30 according to the present invention. A cylinder body 1 is formed with a cylindrical cylinder bore 1a, one end of which is closed. A primary piston 2 and a secondary piston A are movably fitted in the cylinder bore 1a in series in order from the opening side of the cylinder bore 1a. The secondary piston A has a split structure comprising a secondary piston rear piece 4 and a secondary piston front piece 3, which are disposed in series in the axial direction of the cylinder bore 1a.

On the primary piston 2, a primary pressure cup 2b and a primary piston cup 2a are fitted in order from the opening side toward the bottom of the cylinder bore 1a. A primary supply chamber 16 is defined in the cylinder bore 1a by the outer periphery of a reduced-diameter portion of the primary piston 2 between a support portion for the primary pressure cup 2b and a support portion for the primary piston cup 2a.

A secondary piston cup 3a is fitted on the secondary piston front piece 3 of the secondary piston A. A secondary pressure cup 4b is fitted on the secondary piston rear piece 4 of the secondary piston A. A secondary supply chamber 15 is defined in the cylinder bore 1a between a support portion for the secondary piston cup 3a and a support portion for the secondary pressure cup 4b.

Further, a secondary pressure chamber 11 (fluid pressure generating chamber) is defined in the cylinder bore 1a between the bottom of the cylinder body 1 and the secondary piston cup 3a, and a primary pressure chamber 12 (fluid pressure generating chamber) is defined in the cylinder bore 1a between the secondary pressure cup 4b and the primary piston cup 2a.

The cylinder body 1 is provided with a secondary line port 19 communicating with the secondary pressure chamber 11 and a primary line port 20 communicating with the primary pressure chamber 12.

In the secondary supply chamber 15, a first reaction spring 6 (resilient member), a reaction spring retainer 14 and a second reaction spring 5 (resilient member) are interposed in order from the opening side of the cylinder bore 1a between the secondary piston rear piece 4 and the secondary piston front piece 3 so that spring force acts in the direction for extending the spacing between the secondary piston rear piece 4 and the secondary piston front piece 3.

When the secondary piston rear piece 4 comes in contact with the reaction spring retainer 14, and thus the first reaction spring 6 is not compressed any more, and only the second reaction spring 5 is further compressed, as stated above, there is a change in reaction force produced by the first reaction spring 6 and the second reaction spring 5. This change in reaction force is felt as a change in pedal response by the driver actuating the brake pedal 34.

The flange-shaped end of the stopper member 7 is stopped by the boundary between the small-diameter portion of the hole in the secondary piston front piece 3 and the other portion of the hole, which is larger in diameter than the small-diameter portion. Therefore, sliding movement of the stopper member 7 in the hole of the secondary piston front piece 3 is limited within a predetermined range, thereby limiting the maximum length of the secondary piston A in the axial direction.

The diameter of the shaft of the stopper member 7 is smaller than any of the diameter of the first reaction spring 6, the diameter of the hole in the axial center of the reaction spring retainer 14 and the diameter of the second reaction spring 5. The outer diameters of the first reaction spring 6, the reaction spring retainer 14 and the second reaction spring 5 are smaller than the inner diameter of the cylinder bore 1a.

In the secondary pressure chamber 11, a secondary spring 8 is interposed between the bottom of the cylinder body 1 and the secondary piston front piece 3 of the secondary piston A to expand the volume of the secondary pressure chamber 11 by returning the secondary piston front piece 3 (moving the secondary piston front piece 3 rightward as viewed in FIG. 1). In the primary pressure chamber 12, a primary spring 13 is interposed between the primary piston 2 and the secondary piston rear piece 4 of the secondary piston A to expand the volume of the primary pressure chamber 12 by returning the primary piston 2 (moving the primary piston 2 rightward as viewed in FIG. 1).

The primary piston 2 is provided with a communicating passage providing communication between the primary supply chamber 16 and the primary pressure chamber 12. The primary piston 2 is further provided with a primary center valve 22 on a side thereof closer to the primary pressure chamber 12. When the primary piston 2 slides to generate a fluid pressure in the primary pressure chamber 12 (when the primary piston 2 moves leftward as viewed in FIG. 1), the primary center valve 22 is closed to cut off the communication between the primary supply chamber 16 and the primary pressure chamber 12. When the primary piston 2 returns to the inoperative position of the master cylinder 30 (the position of the primary piston 2 shown in FIG. 1), the primary center valve 22 opens to allow the primary supply chamber 16 and the primary pressure chamber 12 to communicate with each other.

Similarly, the secondary piston front piece 3 of the secondary piston A is provided with a communicating passage providing communication between the secondary supply chamber 15 and the secondary pressure chamber 11. The secondary piston front piece 3 is further provided with a secondary center valve 21 on a side thereof closer to the secondary pressure chamber 11. When the secondary piston A slides to generate a fluid pressure in the secondary pressure chamber 11 (when the secondary piston A moves leftward as viewed in FIG. 1), the secondary center valve 21 is closed to cut off the communication between the secondary supply chamber 15 and the secondary pressure chamber 11. When the secondary piston A returns to the inoperative position of the master cylinder 30 (the position of the secondary piston A shown in FIG. 1), the secondary center valve 21 opens to allow the secondary supply chamber 15 and the secondary pressure chamber 11 to communicate with each other.

A reservoir (not shown) is connected to boss portions 23 and 24 formed on the cylinder body 1. A secondary supply port 17 and a primary supply port 18 are formed in the peripheral wall portion of the cylinder body 1 so that the inside of the reservoir communicates with the secondary supply chamber 15 and primary supply chamber 16 in the cylinder bore 1a.

Figure 2:
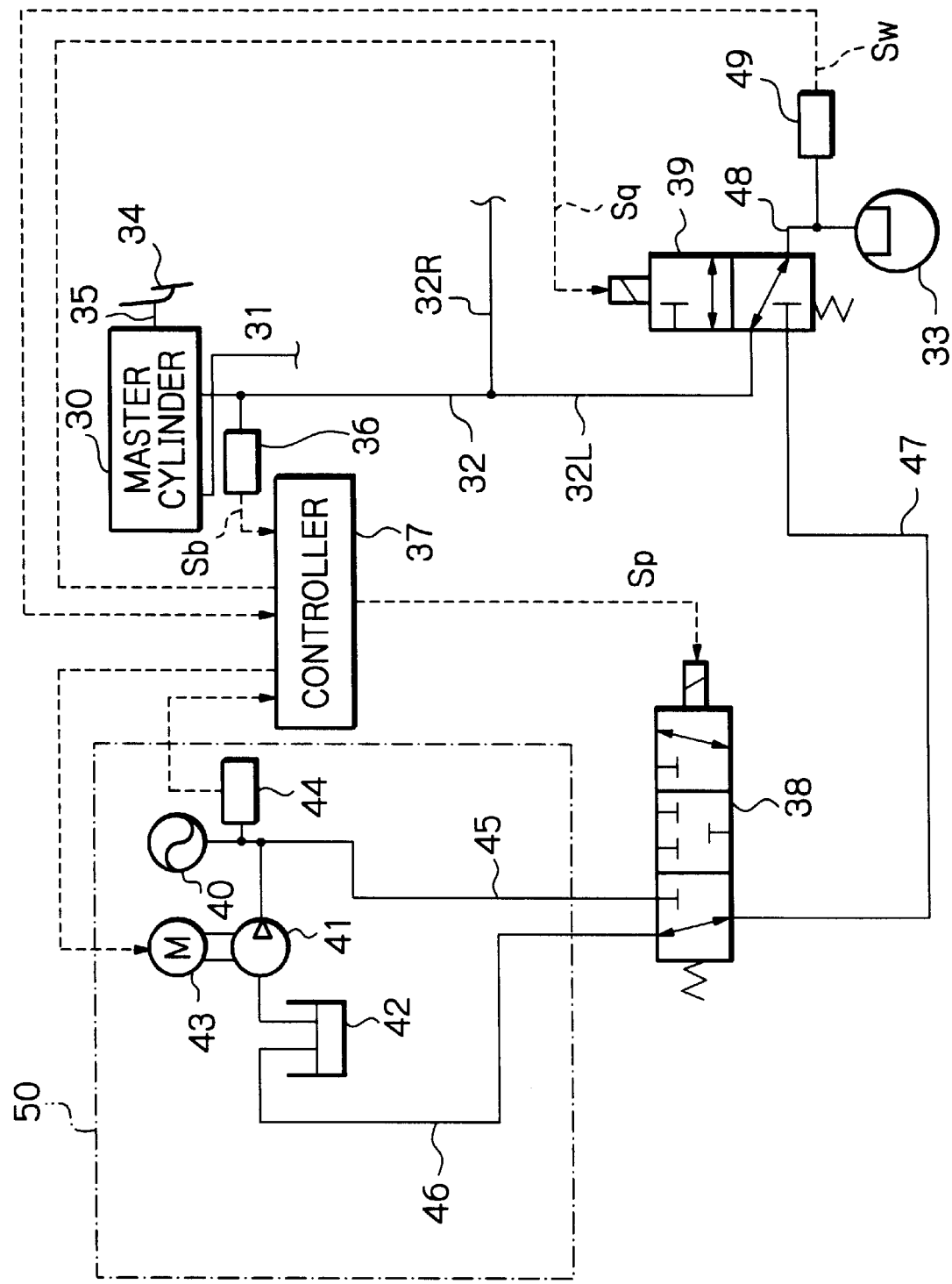
FIG. 2 is a block diagram showing the whole arrangement of a BBW system using the master cylinder according to the present invention.

FIG. 2 shows an example of a BBW system using the master cylinder 30 arranged as stated above as an embodiment of the present invention. The system configuration will be described below.

In FIG. 2, a brake pedal 34 is connected to the above-described primary piston 2 of the master cylinder 30 through a push rod 35. In the case of an H-type brake piping system, for example, the secondary line port 19 is connected with the proximal end of front piping 31, the other end of which is branched and connected to the front right and left wheels. The primary line port 20 is connected with the proximal end of rear piping 32, the other end of which is branched and connected to the rear right and left wheels.

Regarding the wheel cylinder-side arrangement, only devices connected to rear left piping 32L are shown in FIG. 2, for the sake of explanatory simplicity, and will be described below.

Referring to FIG. 2, the system is so arranged that when the brake pedal 34 is depressed, an input corresponding to the amount of depression of the brake pedal 34 is fed into the master cylinder 30 through the push rod 35. Fluid pressures generated in the master cylinder 30 on the basis of the input are transmitted to the front piping 31 and the rear piping 32 from the secondary line port 19 and the primary line port 20, respectively. A master cylinder fluid pressure sensor 36 is connected to the rear piping 32 to detect the fluid pressure of the hydraulic fluid generated in the master cylinder 30 and transmitted to the rear piping 32. The master cylinder fluid pressure sensor 36 outputs a master cylinder fluid pressure signal Sb to a controller 37 as a brake pedal operating quantity signal.

The rear piping 32 is branched out into rear right piping 32R and rear left piping 32L. The distal end of the rear right piping 32R and the distal end of the rear left piping 32L are connected to respective directional control valves. A directional control valve 39 connected to the distal end of the rear left piping 32L is controlled by a directional control valve control signal Sq output from the controller 37. When the BBW system is in an inoperative state or out of order, the directional control valve 39 provides communication between the rear left piping 32L and wheel cylinder piping 48. When the BBW system is in an operative state, the directional control valve 39 provides communication between external fluid pressure source piping 47 (described later) and the wheel cylinder piping 48. A rear wheel cylinder fluid pressure sensor 49 is connected to the wheel cylinder piping 48 to detect the fluid pressure in the wheel cylinder piping 48 and to output a wheel cylinder fluid pressure signal Sw to the controller 37.

An external fluid pressure supply source 50 generates a boosted hydraulic fluid separately from the master cylinder 30. The external fluid pressure supply source 50 includes a pump 41, a pump-driving motor 43, a hydraulic fluid tank 42, and an accumulator 40 containing a highly pressurized hydraulic fluid. The controller 37 controls the fluid pressure in the accumulator 40 by driving the pump-driving motor 43 on the basis of the output of an accumulator fluid pressure sensor 44 so that the hydraulic fluid pressurized to a level higher than a predetermined fluid pressure is always stored in the accumulator 40.

A fluid pressure control valve 38, which uses a three-port, three-position solenoid valve, is controlled by a fluid pressure control valve control signal Sp output from the controller 37 to increase, hold or reduce the wheel cylinder-side fluid pressure according to the position of the fluid pressure control valve 38.

The following is a description of the operation of the master cylinder 30 according to the present invention, which is arranged as stated above, and the operation of the BBW system using the master cylinder 30 according to the present invention.

When the BBW system is in a normal operative state, the communication between each front wheel cylinder (not shown) and the secondary pressure chamber 11 is cut off by the operation of the directional control valve (not shown) provided in the BBW system. The communication between the rear wheel cylinder 33 and the primary pressure chamber 12 is cut off by the operation of the directional control valve 39. In this state, the external fluid pressure source piping 47 and the wheel cylinder piping 48 are in communication with each other.

Therefore, when the driver depresses the brake pedal 34 and thus a fluid pressure is generated in the master cylinder 30, the fluid pressure is not transmitted directly to the wheel cylinder 33. However, the fluid pressure is transmitted to the rear piping 32, and the master cylinder fluid pressure sensor 36 detects it and outputs a master cylinder fluid pressure signal Sb to the controller 37. The controller 37 recognizes that the brake pedal 34 is depressed. Then, the controller 37 outputs a fluid pressure control valve control signal Sp to the fluid pressure control valve 38 so that the accumulator piping 45 and the external fluid pressure source piping 47 communicate with each other. As a result, the accumulator piping 45 and the external fluid pressure source piping 47 communicate with each other. Consequently, the high-pressure hydraulic fluid in the accumulator 40 flows into the wheel cylinder 33 to apply the fluid pressure thereto. Thus, the brakes are applied to the wheel.

The fluid pressure in the wheel cylinder piping 48 is fed back to the controller 37 by the wheel cylinder fluid pressure sensor 49. When the fluid pressure in the wheel cylinder piping 48 rises to a fluid pressure corresponding to the master cylinder fluid pressure signal Sb, the controller 37 sets the fluid pressure control valve 38 in the "hold" position. Thus, the fluid pressure in the wheel cylinder piping 48 is held at a fluid pressure corresponding to the master cylinder fluid pressure signal Sb.

When the driver stops depressing the brake pedal 34, the fluid pressure generated in the master cylinder 30 is reduced. The master cylinder fluid pressure sensor 36 detects the reduction in the fluid pressure. Thus, the controller 37 recognizes that the depressing force has been removed from the brake pedal 34. Then, the controller 37 effects control so that hydraulic fluid tank piping 46 and the external fluid pressure source piping 47 communicate with each other. Consequently, the fluid pressure in the wheel cylinder 33 is reduced, and the brakes that have been applied to the wheel are taken off.

The operation taking place in the master cylinder 30 is as follows. Where the BBW system is in a normal operative state, when the driver depresses the brake pedal 34, an input corresponding to the amount of depression of the brake pedal 34 is transmitted to the primary piston 2 through the push rod 35 from the opening side of the cylinder bore 1a of the cylinder body 1. Consequently, the primary piston 2 is pushed leftward as viewed in FIG. 1, causing a fluid pressure to be generated in the primary pressure chamber 12.

However, the communication between the primary pressure chamber 12 and the wheel cylinder 33 is cut off by the directional control valve 39. Therefore, substantially no hydraulic fluid flows out of the primary pressure chamber 12. Accordingly, there is no change in volume of the primary pressure chamber 12. Thus, the input transmitted to the primary piston 2 is transmitted to the secondary piston rear piece 4 of the secondary piston A through the primary pressure chamber 12.

In the master cylinder 30, the input is transmitted from the secondary piston rear piece 4 to the first reaction spring 6, the reaction spring retainor 14, the second reaction spring 5 and the secondary piston front piece 3 successively, causing the secondary piston front piece 3 to be pushed leftward as viewed in FIG. 1. Consequently, a fluid pressure is also generated in the secondary pressure chamber 11. However, the communication between the secondary pressure chamber 11 and each front wheel cylinder (not shown) is cut off by the directional control valve (not shown). Therefore, substantially no hydraulic fluid flows out of the secondary pressure chamber 11. Accordingly, there is no change in volume of the secondary pressure chamber 11, and the secondary piston front piece 3 does not slide substantially.

Accordingly, the above-described input causes the secondary piston rear piece 4 to slide leftward as viewed in FIG. 1, thus compressing the first reaction spring 6 and the second reaction spring 5. Consequently, the volume of the secondary supply chamber 15 reduces, resulting in a change in the axial length of the secondary piston A. At this time, the hydraulic fluid filling the secondary supply chamber 15 is sent into the reservoir (not shown) through the secondary supply port 17 as the secondary piston rear piece 4 slides.

The reaction force of the first reaction spring 6 has been set sufficiently smaller than that of the second reaction spring 5. Accordingly, the first reaction spring 6 is compressed more than the second reaction spring 5 as the secondary piston rear piece 4 slides.

The secondary piston rear piece 4 eventually comes in contact with the reaction spring retainer 14 as it further slides leftward as viewed in FIG. 1. Consequently, the first reaction spring 6 is not compressed any more, and only the second reaction spring 5 is further compressed.

A bolt-shaped stopper member 7 is threaded at the distal end thereof into the axial center of the secondary piston rear piece 4 from a side thereof closer to the bottom of the cylinder bore 1a. The shaft of the stopper member 7 extends through the first reaction spring 6 and a hole provided in the axial center of the reaction spring retainer 14 and further through the second reaction spring 5. The other end of the stopper member 7, which has a flange-like shape, is slidably fitted in a hole provided in the secondary piston front piece 3 to extend along the axis thereof. A portion of the hole closer to the opening of the cylinder bore 1a is smaller in diameter than the other portion of the hole.

Thus, the master cylinder according to the present invention functions as a stroke simulator as long as the BBW system is in a normal operative state. Because the master cylinder according to the present invention is additionally provided with a function equivalent to an accumulator without providing an extra piston seal, the starting fluid pressure is not different from that of the conventional master cylinder. Accordingly, it is possible to obtain more favorable brake pedal feel than in the case of the fluid pressure absorbing type.

On the other hand, in the event a failure occurs in the BBW system and consequently the fluid pressure in the wheel cylinder 33 will not rise when the brake pedal 34 is depressed, the operation of the directional control valves (not shown) for the front piping 31 provided in the BBW system is canceled, so that the front wheel cylinders (not shown) and the secondary pressure chamber 11 communicate with each other. Similarly, the operation of the directional control valve 39 for the rear piping 32 provided in the BBW system is canceled, so that the rear wheel cylinder 33 and the primary pressure chamber 12 communicate with each other.

In this state, when an input corresponding to the amount of depression of the brake pedal 34 is transmitted to the primary piston 2 through the push rod 35 from the opening side of the cylinder bore 1a of the cylinder body 1, a fluid pressure is generated in the primary pressure chamber 12, and it is transmitted to the rear wheel cylinder 33 from the primary line port 20, causing the brakes to be applied to each rear wheel. Moreover, the fluid pressure pushes the secondary piston rear piece 4 of the secondary piston A.

The pushed secondary piston rear piece 4 slides leftward as viewed in FIG. 1, compressing the first reaction spring 6 and the second reaction spring 5. The compressed first reaction spring 6 and second reaction spring 5 push the secondary piston front piece 3 to slide leftward as viewed in FIG. 1, causing a fluid pressure to be generated in the secondary pressure chamber 11. The fluid pressure generated in the secondary pressure chamber 11 is transmitted to the front wheel cylinders (not shown) from the secondary line port 19, causing the brakes to be applied to the front wheels.

Thus, the master cylinder according to the present invention exhibits the same function as the master cylinder of the conventional hydraulic brake when a failure occurs in the BBW system.

According to this embodiment, the cylinder bore 1a is not a stepped bore and is therefore easy to form by machining as in the case of the conventional master cylinder. When hydraulic fluid charging and air bleeding operation is to be carried out, the hydraulic fluid from the reservoir flows into the secondary supply chamber 15, which exhibits the simulator function, and flows therefrom into the secondary pressure chamber 11 and the primary pressure chamber 12. Therefore, the hydraulic fluid charging and air bleeding operation is easy as in the case of the conventional master cylinder.

In the tandem master cylinder of a hydraulic brake, the primary piston usually has a wider slidable range than that of the secondary piston. Therefore, if the primary piston is provided with the contraction-extension function (simulator function), the primary pressure cup needs to be disposed further away from the primary supply port than in a case where the secondary piston is provided with the contraction-extension function, in order to prevent the primary pressure cup from being damaged by passing the primary supply port. In addition, because the operation of the push rod to push the primary piston includes an operation of slightly prying the primary piston, in other words, the push force direction is not steadily aligned with the axis of the primary piston, if the primary piston is provided with the contraction-extension function, the axial length of the pressure cup support portion of the primary piston needs to be set at a length approximately equal to the distance between the primary piston cup support portion and primary pressure cup support portion of the conventional primary piston in order to cancel the prying. Consequently, the overall length of the master cylinder becomes undesirably long. In contrast, the present invention enables the overall length of the master cylinder to be reduced because the secondary piston is arranged to be variable in the axial length.

It is preferable from the viewpoint of pedal feel that the pedal operation be accompanied by some hysteresis. When the primary piston is provided with the stroke simulator function, only the sliding resistance of the primary pressure cup can be used to provide the hysteresis. In this regard, in the present invention, the secondary piston is provided with the stroke simulator function. Therefore, it is possible to use the sliding resistances of the primary piston cup and the secondary pressure cup in addition to the above. This is favorable for the adjustment of hysteresis.

Although the invention is described in connection with a tandem master cylinder, It will be appreciated that the invention is also applicable to a master cylinder having a single piston.

Although this embodiment uses a tandem master cylinder in which center valve are used for both the primary and secondary sides, it should be noted that the present invention is not necessarily limited thereto but may be applied to a conventional master cylinder, a plunger master cylinder, or a composite master cylinder formed by combining the conventional and plunger master cylinders. In short, the present invention is applicable to any tandem master cylinder having a secondary piston.

Further, in this embodiment, springs are used as resilient members to allow the secondary piston to vary a preset axial length thereof according to an input applied thereto while keeping reaction force and to permit the secondary piston to be restored to the preset axial length when the application of the input is canceled. However, the resilient members are not necessarily limited to springs but may be rubber members or the like.

Although resilient members are used in this embodiment, the present invent on is not necessarily limited thereto. For example, he arrangement may be such that no resilient member is provided in the secondary supply chamber, but an accumulator is provided on the reservoir side of the secondary supply port, and when the primary piston and the secondary piston rear piece are pushed by an input corresponding to the amount of depression of the brake pedal, the hydraulic fluid in the secondary supply chamber moves to the accumulator through the secondary supply port, causing the axial length of the secondary piston to vary, and when the application of the input is canceled, the hydraulic fluid is returned to the secondary supply chamber through the secondary supply port by reaction force produced by the accumulator, causing the secondary supply chamber to be restored to the previous axial length.

Although this embodiment uses an H-type piping system that connects the secondary pressure chamber and the primary pressure chamber to the two front wheels and the two rear wheels, respectively, the present invention is not necessarily limited thereto. It is also possible to use an X-type piping system in which the secondary pressure chamber is connected to one front wheel and one rear wheel on the opposite side to this front wheel, and the primary pressure chamber is connected to the other front wheel and the other rear wheel. Other piping systems are also usable.

As has been stated above, the present invention is desirably embodied as a tandem master cylinder wherein a primary piston and a secondary piston are independently slidably disposed in a cylinder bore, one end of which is closed, in series in the axial direction of the cylinder bore to define in the cylinder bore two independent fluid pressure generating chambers which are connected to wheel cylinders, respectively. The secondary piston, which is placed closer to the bottom of the cylinder bore than the primary piston, is capable of varying a preset axial length thereof according to an input applied thereto while keeping reaction force, and when the application of the input is canceled, the secondary piston is restored to the preset axial length. Thus, it is possible to obtain a master cylinder capable of realizing the stroke simulator function without the need to change the structure around the brake pedal and without impairing the brake pedal feel and easy to form by machining and also facilitating the hydraulic fluid charging and air bleeding operation.

It should be noted that the present invention is not necessarily limited to the foregoing embodiments but can be modified In a variety of ways without departing from the gist of the present invention.

What is claimed is:

1. A master cylinder comprising:
   a cylinder having a cylinder bore, one end of which is closed to form a bottom, and a port communicated with a reservoir; and
   at least one piston slidably disposed in said cylinder bore for partially defining a fluid pressure generating chamber which is connected to at least one wheel cylinder, wherein said piston includes:
      a front piece adjacent to said fluid pressure generating chamber;
      a rear piece on the side of the front piece remote from said fluid pressure generating chamber;
      seals supported by said front and rear pieces to define therebetween a fluid supply chamber for the fluid pressure generating chamber, the seal supported by said front piece separating said fluid pressure generating chamber from said fluid supply chamber; and
      a device for connecting said front and rear pieces so that it permits the distance between these pieces to be reduced upon application of an input force to said piston while exerting a reaction force and restores the original distance upon cancellation of the input force;
      wherein said port communicates with said fluid supply chamber so that fluid in said fluid supply chamber is not pressurized when said distance between said front and rear pieces is reduced.

2. A master cylinder according to claim 1, wherein said device includes a resilient part situated between said front and rear pieces.

3. A master cylinder according to claim 2, wherein said resilient part comprises a spring.

4. A master cylinder comprising:
   a cylinder having a cylinder bore one end of which is closed to form a bottom; and
   at least one piston slidably disposed in said cylinder bore for partially defining a fluid pressure generating chamber which is connected to at least one wheel cylinder, wherein said piston includes:
      a front piece adjacent to said fluid pressure generating chamber;
      a rear piece on the side of the front piece remote from said fluid pressure generating chamber;
      seals supported by said front and rear pieces to define therebetween a fluid supply chamber for the fluid pressure generating chamber, the seal supported by said front piece separating said fluid pressure generating chamber from said fluid supply chamber; and
      a device for connecting said front and rear pieces so that it permits the distance between these pieces to be reduced upon application of an input force to said piston while exerting a reaction force and restores the original distance upon cancellation of the input force;
      wherein said device includes resilient means situated between said front and rear pieces; and
      wherein said device includes a stopper which limits relative movement of said front and rear pieces away from each other beyond said original distance.

5. A master cylinder comprising:
   a cylinder having a cylinder bore one end of which is closed to form a bottom; and
   at least one piston slidably disposed in said cylinder bore for partially defining a fluid pressure generating chamber which is connected to at least one wheel cylinder, wherein said piston includes:
      a front piece adjacent to said fluid pressure generating chamber;
      a rear piece on the side of the front piece remote from said fluid pressure generating chamber;
      seals supported by said front and rear pieces to define therebetween a fluid supply chamber for the fluid pressure generating chamber, the seal supported by said front piece separating said fluid pressure generating chamber from said fluid supply chamber; and a device for connecting said front and rear pieces so that it permits the distance between these pieces to be reduced upon application of an input force to said piston while exerting a reaction force and restores the original distance upon cancellation of the input force;

wherein said device includes two springs of different spring constants disposed in series with a spring retainer interposed therebetween and situated between said front and rear pieces.

6. A tandem master cylinder comprising:

a cylinder having a cylinder bore, one end of which is closed to form a bottom, and a port communicated with a reservoir; and a primary and a secondary pistons independently slidably disposed in said cylinder bore in series in the axial direction of the cylinder bore for respectively partially defining independent primary and secondary fluid pressure generating chambers which are connected to wheel cylinders, said secondary piston being placed closer to said bottom than said primary piston, wherein said secondary piston includes:
a front piece adjacent to said secondary fluid pressure generating chamber;

a rear piece on the side of the front piece remote from said secondary fluid pressure generating chamber;

seals supported by said front and rear pieces to define therebetween a fluid supply chamber for said secondary fluid pressure generating chamber, one of said seals supported by said front piece separating said secondary fluid pressure generating chamber from said fluid supply chamber; and a device for connecting said front and rear pieces so that it permits the distance between these pieces to be reduced upon application of an input force to said secondary piston while exerting a reaction force and restores the original distance upon cancellation of the input force;

wherein said port communicates with said fluid supply chamber so that fluid in said fluid supply chamber is not pressurized when said distance between said front and rear pieces is reduced.

7. A master cylinder according to claim 6, wherein said device includes a resilient part situated between said front and rear pieces.

8. A master cylinder according to claim 7, wherein said resilient part comprises a spring.

9. A master cylinder according to claim 6, wherein a second seal is supported by said rear piece so that said fluid supply chamber is defined between said front and rear pieces.

10. A tandem master cylinder comprising:

a cylinder having a cylinder bore one end of which is closed to form a bottom; and a primary and a secondary pistons independently slidably disposed in said cylinder bore in series in the axial direction of the cylinder bore for respectively partially defining independent primary and secondary fluid pressure generating chambers which are connected to wheel cylinders, said secondary piston being placed closer to said bottom than said primary piston, wherein said secondary piston includes:
a front piece adjacent to said secondary fluid pressure generating chamber;

a rear piece on the side of the front piece remote from said secondary fluid pressure generating chamber;

a seal supported by said front piece to separate said secondary fluid pressure generating chamber and a fluid supply chamber for the secondary fluid pressure generating chamber; and a device for connecting said front and rear pieces so that it permits the distance between these pieces to be reduced upon application of an input force to said secondary piston while exerting a reaction force and restores the original distance upon cancellation of the input force;

wherein said device includes resilient means situated between said front and rear pieces; and wherein said device includes a stopper which limits relative movement of said front and rear pieces away from each other beyond said original distance.

11. A tandem master cylinder comprising:

a cylinder having a cylinder bore one end of which is closed to form a bottom; and a primary and a secondary pistons independently slidably disposed in said cylinder bore in series in the axial direction of the cylinder bore for respectively partially defining independent primary and secondary fluid pressure generating chambers which are connected to wheel cylinders, said secondary piston being placed closer to said bottom than said primary piston, wherein said secondary piston includes:
a front piece adjacent to said secondary fluid pressure generating chamber;

a rear piece on the side of the front piece remote from said secondary fluid pressure generating chamber;

a seal supported by said front piece to separate said secondary fluid pressure generating chamber and a fluid supply chamber for the secondary fluid pressure generating chamber; and a device for connecting said front and rear pieces so that it permits the distance between these pieces to be reduced upon application of an input force to said secondary piston while exerting a reaction force and restores the original distance upon cancellation of the input force;

wherein said device includes two springs of different spring constants disposed in series with a spring retainer interposed therebetween, and situated between said front and rear pieces.

* * * * *